(12) United States Patent
Matsushima

(10) Patent No.: US 10,175,537 B2
(45) Date of Patent: Jan. 8, 2019

(54) LIQUID CRYSTAL DISPLAY DEVICE

(71) Applicant: Japan Display Inc., Minato-ku (JP)

(72) Inventor: Toshiharu Matsushima, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/674,720

(22) Filed: Aug. 11, 2017

(65) Prior Publication Data

US 2018/0059486 A1 Mar. 1, 2018

(30) Foreign Application Priority Data

Aug. 29, 2016 (JP) ................................ 2016-166440

(51) Int. Cl.
*G02F 1/1343* (2006.01)
*G02F 1/1337* (2006.01)
*G02F 1/1335* (2006.01)
*G02F 1/1368* (2006.01)
*G02F 1/137* (2006.01)

(52) U.S. Cl.
CPC .. *G02F 1/133707* (2013.01); *G02F 1/133512* (2013.01); *G02F 1/134309* (2013.01); *G02F 1/1368* (2013.01); *G02F 2001/13706* (2013.01); *G02F 2001/134372* (2013.01); *G02F 2201/123* (2013.01); *G02F 2201/128* (2013.01)

(58) Field of Classification Search
CPC ......... G02F 1/134363; G02F 1/134309; G02F 1/133707; G02F 1/133512
See application file for complete search history.

(56) References Cited

U.S. PATENT DOCUMENTS

| 9,298,051 B2 | 3/2016 | Matsushima | |
|---|---|---|---|
| 9,383,614 B2 | 7/2016 | Matsushima | |
| 9,513,516 B2 | 12/2016 | Matsushima | |
| 2002/0033922 A1* | 3/2002 | Hidehira | G02F 1/134363 349/141 |
| 2013/0100388 A1 | 4/2013 | Matsushima | |
| 2014/0092353 A1 | 4/2014 | Matsushima | |
| 2014/0307212 A1* | 10/2014 | Oka | G02F 1/134363 349/123 |
| 2014/0354931 A1 | 12/2014 | Kurasawa et al. | |
| 2016/0062191 A1* | 3/2016 | Matsushima | G02F 1/134309 349/110 |

FOREIGN PATENT DOCUMENTS

| JP | 2013-109309 | 6/2013 |
|---|---|---|
| JP | 2014-071309 | 4/2014 |

* cited by examiner

*Primary Examiner* — James Dudek
(74) *Attorney, Agent, or Firm* — Oblon, McClelland, Maier & Neustadt, L.L.P.

(57) ABSTRACT

According to one embodiment, a liquid crystal display device includes second substrates, a light-shielding layer, and a liquid crystal layer. The first substrate includes pixel electrodes, a common electrode, and subpixel areas each including area in which the pixel electrode is present and a second area in which the pixel electrode is not present. Each of the subpixel areas includes first and second sides. The first area includes an axial area and branch areas. The second area includes a gap area between the adjacent branch areas. The axial area includes a projection portion projecting to the second side and in alignment with the gap area, and overlaps the light-shielding layer.

10 Claims, 13 Drawing Sheets

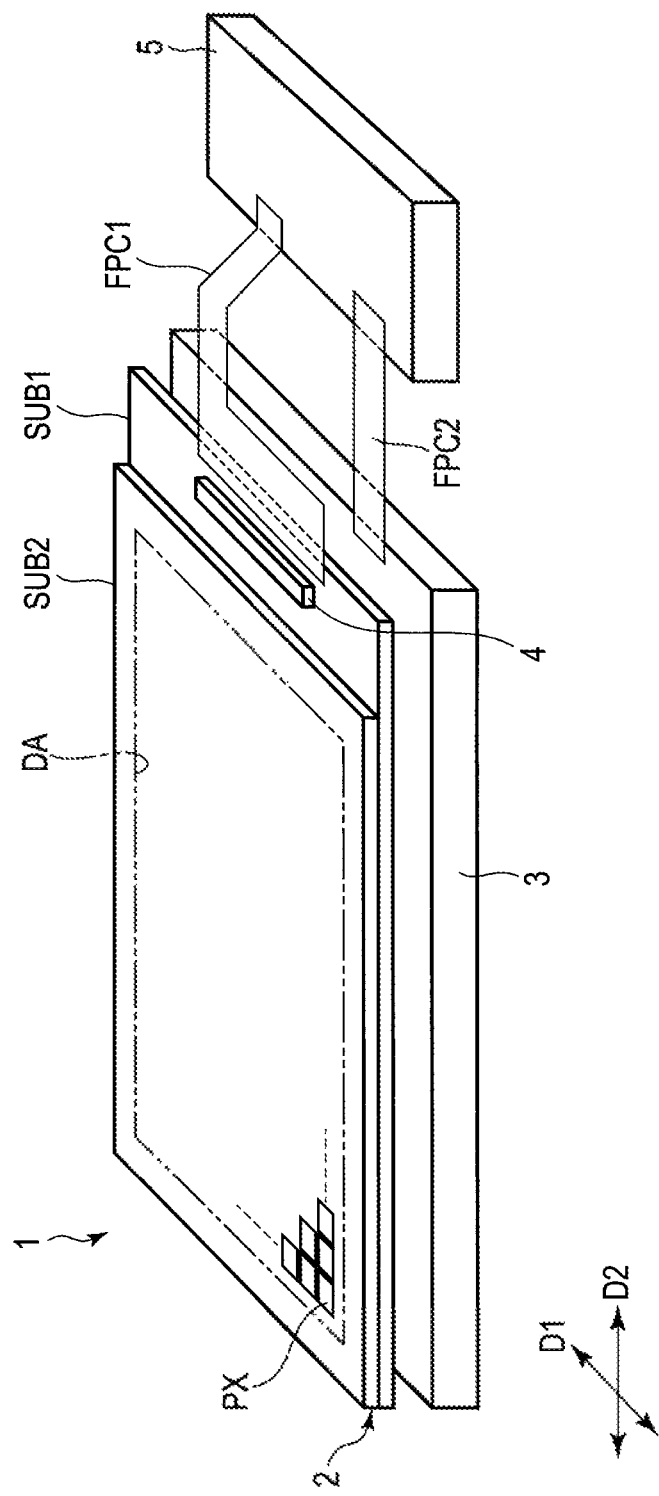
F I G. 1

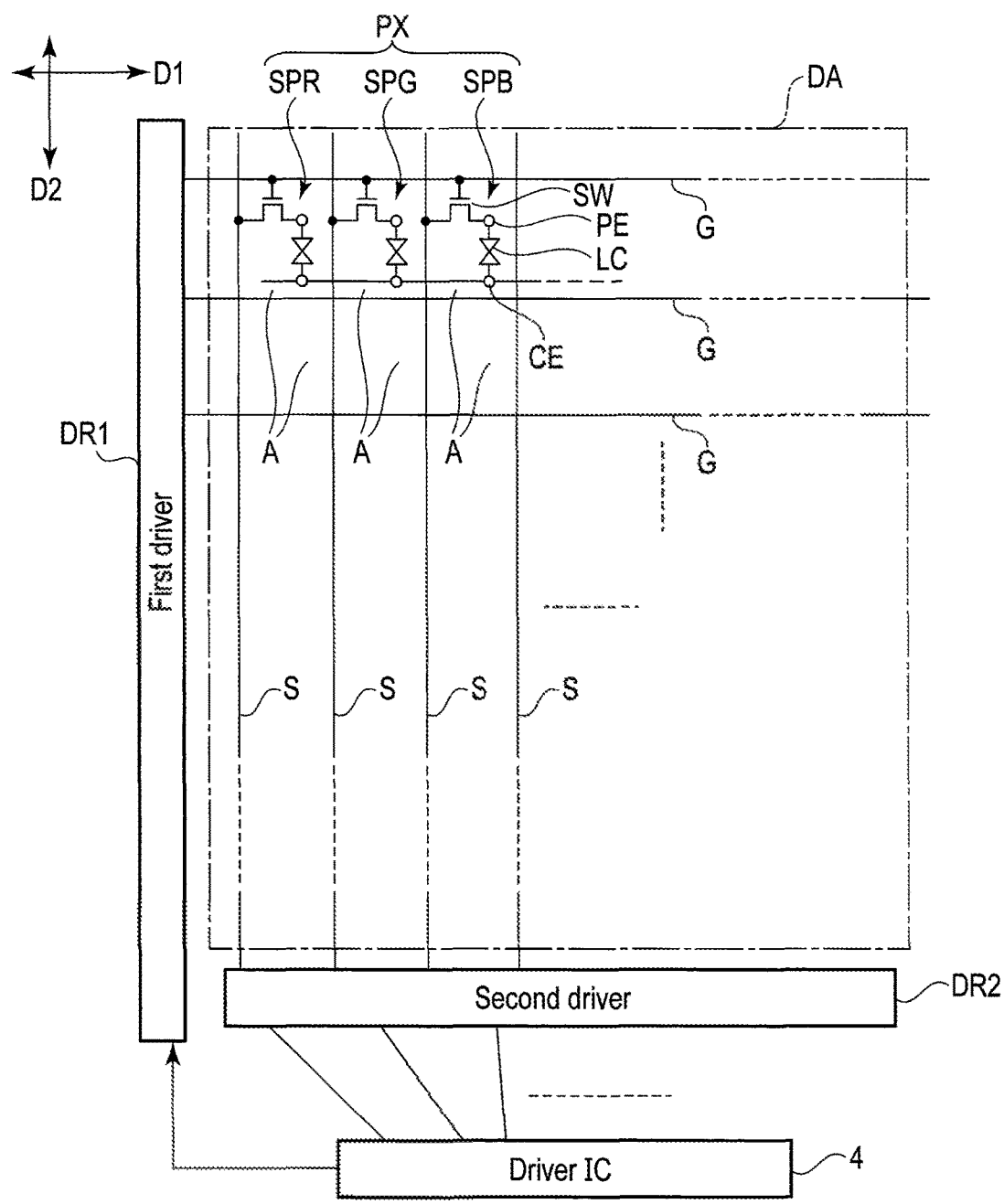
F I G. 2

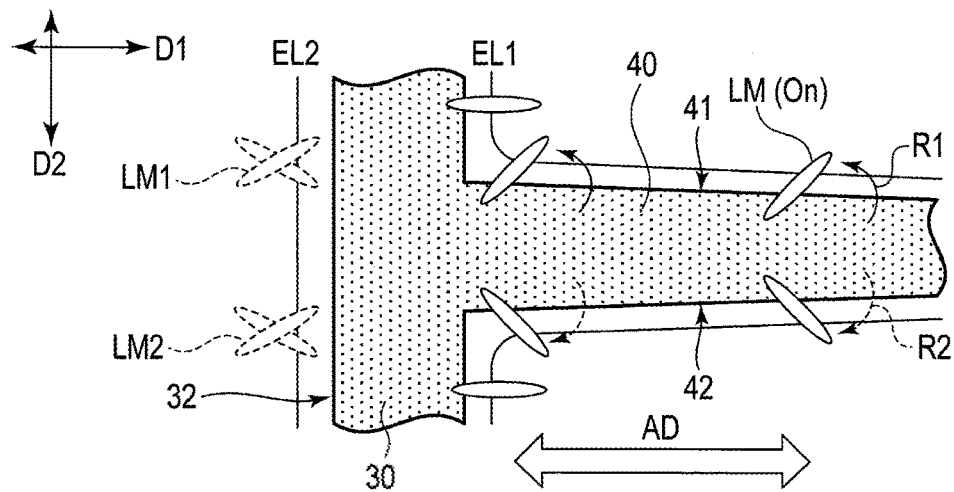
F I G. 8
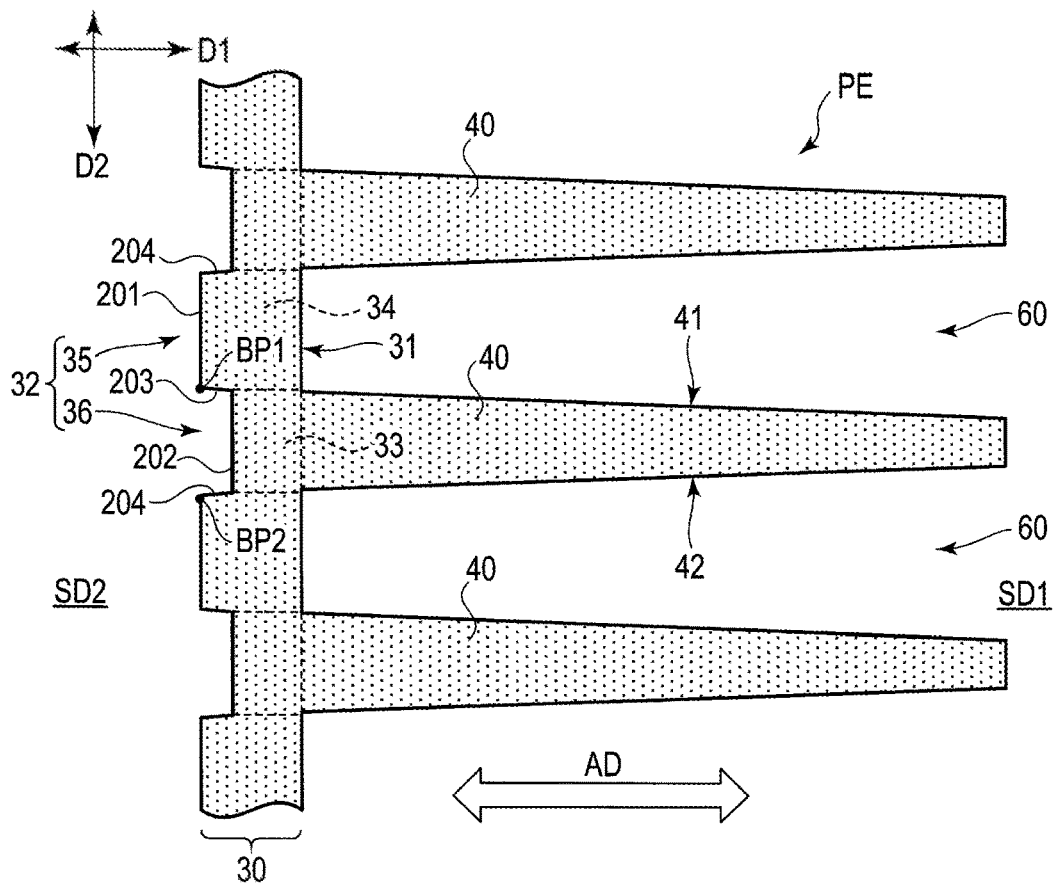
F I G. 9

US 10,175,537 B2

LIQUID CRYSTAL DISPLAY DEVICE

CROSS-REFERENCE TO RELATED APPLICATIONS

This application is based upon and claims the benefit of priority from Japanese Patent Application No. 2016-166440, filed Aug. 29, 2016, the entire contents of which are incorporated herein by reference.

FIELD

Embodiments described herein relate generally to a liquid crystal display device.

BACKGROUND

A liquid crystal display device in in-plane switching (IPS) mode is known as an example of a display device. The liquid crystal display device in IPS mode comprises a pair of substrates facing each other via a liquid crystal layer. One of the substrates comprises a pixel electrode and a common electrode. The alignment of the liquid crystal molecules of the liquid crystal layer is controlled using the lateral electric field generated between the electrodes. A liquid crystal display device in fringe-field switching (FFS) mode has been put to practical use. In the liquid crystal display device in FFS mode, a pixel electrode and a common electrode are provided in different layers, and the fringe electric field generated between the electrodes is used to control the alignment of liquid crystal molecules.

The following liquid crystal display device has been developed. In the liquid crystal display device, a pixel electrode and a common electrode are provided in different layers. A slit is provided in the electrode closer to a liquid crystal layer than the other electrode. The liquid crystal molecules near the both edges of the slit in the width direction are rotated in opposite directions. The system of this liquid crystal display device is clearly different from the FFS mode, and can increase the speed of response and improve the stability of alignment in comparison with the conventional FFS mode. Hereinafter, the structure of this type of liquid crystal display device is called a high-speed response mode.

BRIEF DESCRIPTION OF THE DRAWINGS

FIG. 1 is a perspective view showing the general structure of a liquid crystal display device according to a first embodiment.

FIG. 2 shows the general equivalent circuit of the liquid crystal display device according to the first embodiment.

FIG. 8 shows a comparative example with the present embodiment.

FIG. 9 is a general plan view showing a part of a pixel electrode according to a second embodiment.

DETAILED DESCRIPTION

Figure 3:
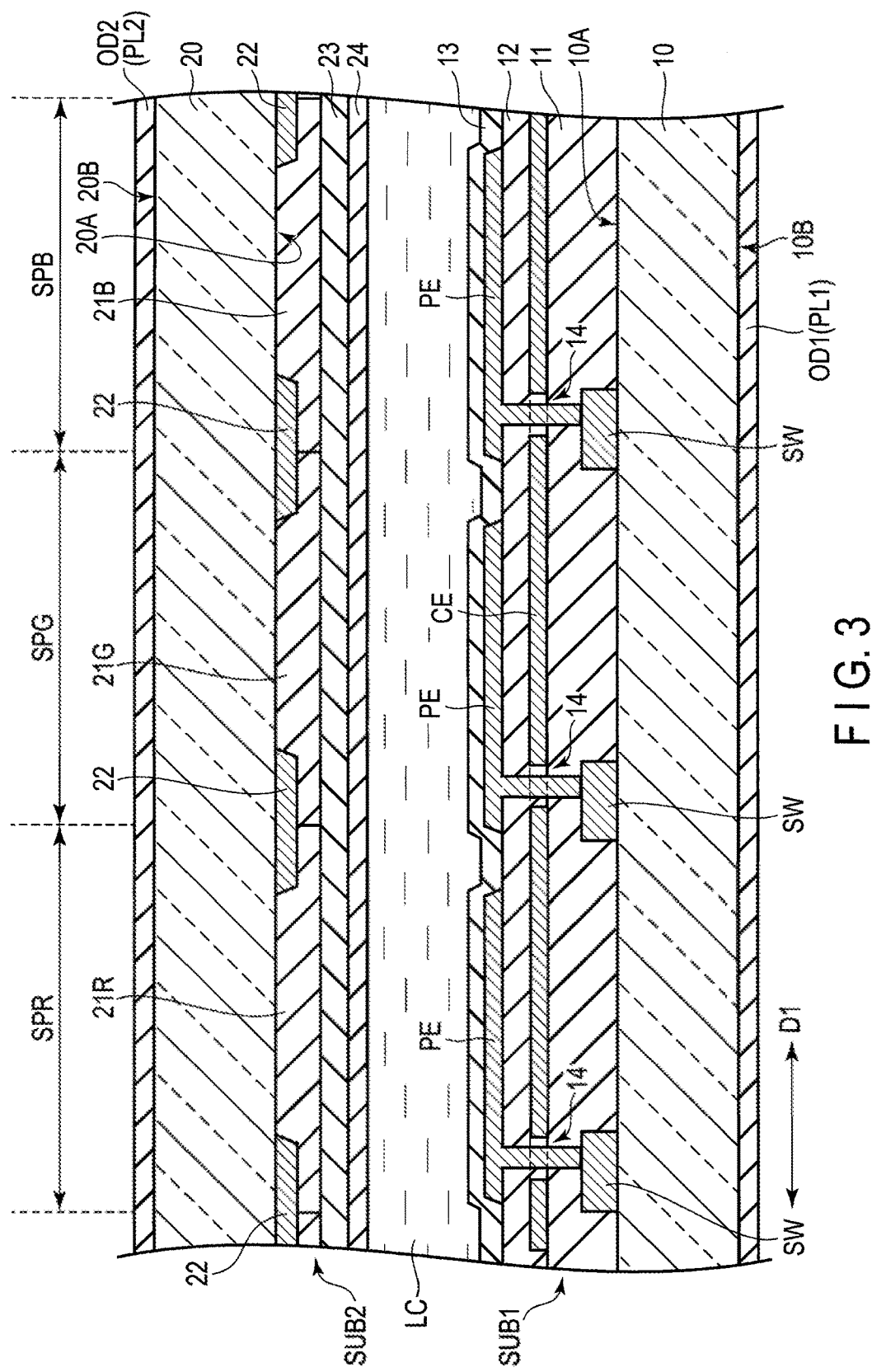
FIG. 3 shows a part of a cross-sectional surface of the liquid crystal display device according to the first embodiment.

In general, according to one embodiment, a liquid crystal display device comprises a first substrate, a second substrate, a light-shielding layer, and a liquid crystal layer including liquid crystal molecules between the first substrate and the second substrate. The first substrate comprises a plurality of video signal lines, pixel electrodes electrically connected to the video signal lines, a common electrode facing the pixel electrodes and rotating the liquid crystal molecules by generating an electric field between the common electrode and the pixel electrodes, and a plurality of subpixel areas each comprising a first area and a second area. The first area is an area in which the pixel electrode is present, and the second area is an area in which the pixel electrode is not present. Each of the subpixel areas comprises a first side and a second side in a first direction. The first area includes an axial area extending in a second direction intersecting the first direction, and a plurality of branch areas extending in the first direction from the axial area to the first side. The second area includes a gap area extending in the first direction between the adjacent branch areas. The axial area comprises a projection portion projecting to the second side and in alignment with the gap area in the first direction, and overlaps the light-shielding layer.

According to another embodiment, a liquid crystal display device comprises a first substrate, a second substrate, a light-shielding layer, and a liquid crystal layer including liquid crystal molecules between the first substrate and the second substrate. The first substrate comprises a plurality of video signal lines, pixel electrodes electrically connected to the video signal lines, a common electrode facing the pixel electrodes and rotating the liquid crystal molecules by generating an electric field between the common electrode and the pixel electrodes, and a plurality of subpixel areas each comprising a first area and a second area. The first area is an area in which the common electrode is not present, and the second area is an area in which the common electrode is present. Each of the subpixel areas comprises a first side and a second side in a first direction. The first area includes an axial area extending in a second direction intersecting the first direction, and a plurality of branch areas extending in the first direction from the axial area to the first side. The second area includes a gap area extending in the second direction between the adjacent branch areas. The axial area comprises a projection portion projecting to the second side and in alignment with the gap area in the first direction, and overlaps the light-shielding layer.

The above structures allow the provision of a liquid crystal display device in high-speed response mode in which the stability of alignment has been further improved.

Various embodiments will be described with reference to the accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the drawings are schematically illustrated rather than as an accurate representation of what is implemented. However, such schematic illustration is merely exemplary, and in no way restricts the interpretation of the invention. In the drawings, reference numbers of continuously arranged elements equivalent or similar to each other are omitted in some cases. In the specification and drawings, structural elements which function in the same or a similar manner to those described in connection with preceding drawings are denoted by like reference numbers, detailed description thereof being omitted unless necessary.

In each embodiment, a transmissive type liquid crystal display device is disclosed as an example of a liquid crystal display device. However, each embodiment does not prevent application of individual technical ideas disclosed in the embodiment to other types of display devices. Other types of display devices are assumed to include, for example, a reflective type liquid crystal display device which displays an image using outside light, and a liquid crystal display device having both the transmissive function and the reflective function.

In this specification, the phrases "α includes A, B or C", "α includes one of A, B and C" and "α includes an element selected from a group consisting of A, B and C" do not exclude a case where α includes a plurality of combinations of A to C unless specified. Further, these phrases do not exclude a case where α includes other elements.

First Embodiment

FIG. 1 is a perspective view showing the general structure of a liquid crystal display device 1 (hereinafter, referred to as a display device 1) according to a first embodiment. The display device 1 may be used for various devices such as a smartphone, a tablet, a mobile phone, a computer, a television receiver, an in-vehicle unit, a game console and a wearable device.

The display device 1 comprises a display panel 2, a backlight 3 facing the display panel 2, a driver IC 4 which drives the display panel 2, a control module 5 which controls the operation of the display panel 2 and the backlight 3, and flexible circuit boards FPC1 and FPC2 which transmit a control signal to the display panel 2 and the backlight 3.

In the present embodiment, a first direction D1 is the direction of extension of each branch area 40 as described later. A second direction D2 is the direction of extension of each axial area 30 as described later. In FIG. 1, the first direction D1 is also applicable to a direction parallel to the short sides of the display panel 2. The second direction D2 is also applicable to, for example, a direction parallel to the long sides of the display panel 2. In the example shown in FIG. 1, the first direction D1 is perpendicular to the second direction D2. However, the first and second directions D1 and D2 may intersect at another angle.

The display panel 2 comprises first and second substrates SUB1 and SUB2 facing each other, and a liquid crystal layer (the liquid crystal layer LC described later) provided between the first and second substrates SUB1 and SUB2. The display panel 2 comprises a display area DA which displays an image. The display panel 2 comprises, for example, a plurality of pixels PX arranged in matrix in the first and second directions Dl and D2 in the display area DA.

FIG. 2 shows the general equivalent circuit of the display device 1. The display device 1 comprises a first driver DR1, a second driver DR2, a plurality of scanning signal lines G connected to the first driver DR1, and a plurality of video signal lines S connected to the second driver DR2. The scanning signal lines G extend in the first direction D1 and are arranged in the second direction D2 in the display area DA. In the display area DA, the video signal lines S extend in the second direction D2, are arranged in the first direction D1, and intersect the scanning signal lines G.

The display device 1 comprises a plurality of subpixel areas A. The subpixel areas A are defined by the scanning signal lines G and the video signal lines S as seen in plan view. A subpixel SP is formed in each subpixel area A. In the present embodiment, it is assumed that each pixel PX includes a subpixel SPR displaying red, a subpixel SPG displaying green and a subpixel SPB displaying blue. However, each pixel PX may further include, for example, a subpixel SP displaying white, or may include a plurality of subpixels SP corresponding to the same color.

Each subpixel SP comprises a switching element SW, a pixel electrode PE, and a common electrode CE facing the pixel electrode PE. The common electrode CE is formed over a plurality of subpixels SP. Each switching element SW is connected to a corresponding scanning signal line G, a corresponding video signal line S and a corresponding pixel electrode PE. Each pixel electrode PE is electrically connected to a corresponding video signal line S via a corresponding switching element SW.

The first driver DR1 supplies a scanning signal to the scanning signal lines G in series. The second driver DR2 selectively supplies a video signal to the video signal lines S. When a scanning signal is supplied to a scanning signal line G corresponding to a switching element SW, and further when a video signal is supplied to the video signal line S connected to the switching element SW, voltage is applied to the pixel electrode PE in accordance with the video signal. At this time, an electric field is generated between the pixel electrode PE and the common electrode CE. By this electric field, the alignment of the liquid crystal molecules of the liquid crystal layer LC is changed from the initial alignment state where no voltage is applied. By this operation, an image is displayed in the display area DA.

FIG. 3 shows a part of a cross-sectional surface of the display device 1. The cross-sectional surface shown in FIG. 3 is the cross-sectional surface of subpixels SPR, SPG and SPB included in a pixel PX in the first direction D1.

The first substrate SUB1 comprises a first insulating substrate 10 such as a phototransmissive glass substrate or resin substrate. The first insulating substrate 10 comprises a first main surface 10A facing the second substrate SUB2, and a second main surface 10B provided on a side opposite to the first main surface 10A. The first substrate SUB1 further comprises the switching elements SW, the pixel electrodes PE, the common electrode CE, a first insulating layer 11, a second insulating layer 12 and a first alignment film 13.

Each switching element SW is provided on the first main surface 10A of the first insulating substrate 10, and is covered with the first insulating layer 11. In FIG. 3, the illustration of the scanning signal lines G or the video signal lines S is omitted. Moreover, in FIG. 3, each switching element SW is simplified. In the actual device, the first insulating layer 11 includes a plurality of layers, and the switching elements SW include semiconductor layers and various electrodes formed in the layers included in the first insulating layer 11.

In the example of FIG. 3, subpixels SPR, SPG and SPB comprise the respective pixel electrodes PE. The common electrode CE is provided over subpixels SPR, SPG and SPB. The common electrode CE is formed on the first insulating layer 11, and comprises an aperture 14 at a position facing each pixel electrode PE. The common electrode CE is covered with the second insulating layer 12.

The pixel electrodes PE are formed on the second insulating layer 12, and face the common electrode CE. The pixel electrodes PE are electrically connected to the switching elements SW of subpixels SPR, SPG and SPB via the apertures 14, respectively. The pixel electrodes PE and the common electrode CE may be formed of a transparent conductive material such as indium tin oxide (ITO). The first alignment film 13 covers the pixel electrodes PE, and is in contact with the liquid crystal layer LC.

The second substrate SUB2 comprises a second insulating substrate 20 such as a phototransmissive grass substrate or resin substrate. The second insulating substrate 20 comprises a first main surface 20A facing the first substrate SUB1, and a second main surface 20B provided on a side opposite to the first main surface 20A. The second substrate SUB2 further comprises color filters 21 (21R, 21G and 21B), a light-shielding layer 22, an overcoat layer 23 and a second alignment film 24. The light-shielding layer 22 may be provided in the first substrate SUB1.

As seen in plan view, the light-shielding layer 22 is provided in each boundary between subpixels SPR, SPG and SPB. The overcoat layer 23 covers color filters 21R, 21G and 21B, and planarizes the surfaces of color filters 21R, 21G and 21B. The second alignment film 24 covers the overcoat layer 23, and is in contact with the liquid crystal layer LC.

Thus, the first alignment film 13 and the second alignment film 24 have a function for causing the liquid crystal molecules contained in the liquid crystal layer LC to align in the initial alignment direction. For example, the first alignment film 13 and the second alignment film 24 are optical alignment films obtained by optical alignment treatment for irradiating polymer films such as polyimide with ultraviolet so as to impart anisotropy. However, the first alignment film 13 and the second alignment film 24 may be rubbing alignment films obtained by rubbing treatment. Alternatively, one of the first alignment film 13 and the second alignment film 24 may be an optical alignment film, and the other one may be a rubbing alignment film.

In the example of FIG. 3, a first optical element OD1 including a first polarizer PL1 is provided on the second main surface 10B of the first insulating substrate 10. A second optical element OD2 including a second polarizer PL2 is provided on the second main surface 20B of the second insulating substrate 20.

Figure 4:
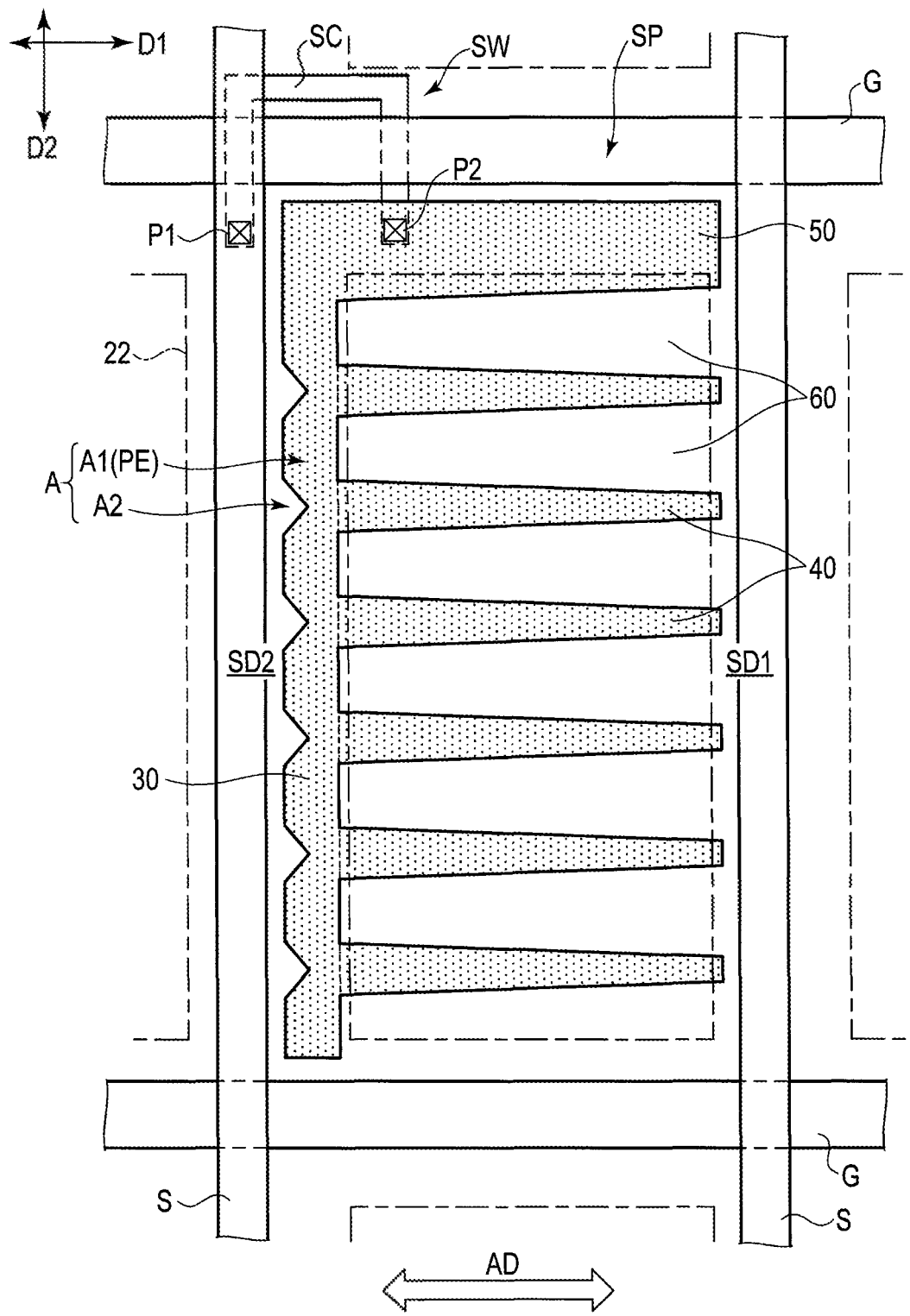
FIG. 4 is a general plan view of a subpixel provided in the liquid crystal display device according to the first embodiment.

FIG. 4 is a plan view schematically showing an example of a subpixel SP. Each of the above subpixel areas A is surrounded by two scanning signal lines G adjacent to each other in the second direction D2 and two video signal lines S adjacent to each other in the first direction D1. The subpixel area A comprises a first side SD1 (the right side in the figure) and a second side SD2 (the left side in the figure) in the first direction D1.

The subpixel area A comprises a first area A1 and a second area A2. In FIG. 4, the first area A1 is indicated with a dot pattern. The second area A2 has a shape obtained by removing the first area A1 from the subpixel area A.

The first area A1 comprises the axial area 30, and a plurality of branch areas 40. The axial area 30 extends in the second direction D2, and is arranged on the second side SD2 in the subpixel area A. Each branch area 40 extends from the axial area 30 to the first side SD1 in the first direction D1. For example, each branch area 40 has a shape tapering toward an end.

In FIG. 4, the first area A1 further comprises an end area 50. The end area 50 extends from the axial area 30 to the first side SD1 in the first direction D1 in a manner similar to that of the branch areas 40. The end area 50 has a width greater than that of each branch area 40 in the second direction D2.

The second area A2 comprises a gap area 60 extending in the first direction D1 between two branch areas 40 adjacent to each other in the second direction D2. In addition, the gap area 60 is formed between the end area 50 and the branch area 40 adjacent to the end area 50.

In the example of FIG. 4, all of the branch areas 40 have the same shape, and are arranged in the second direction D2 at regular intervals. Similarly, all of the gap areas 60 have the same shape, and are arranged in the second direction D2 at regular intervals. However, the shapes or intervals of the branch areas 40 or the gap areas 60 are not necessarily the same as each other. The shapes or intervals may be partially different from each other.

In one of the first and second areas A1 and A2, the pixel electrode PE is present. In the other one, pixel electrode PE is not present. In the example of FIG. 4, the pixel electrode PE is formed in the first area A1, and no pixel electrode PE is formed in the second area A2. In the present embodiment, the shape of the first area A1 is equivalent to the shape of the pixel electrode PE.

The switching element SW comprises a semiconductor layer SC. The semiconductor layer SC is connected to the video signal line S at a connective position P1, and is connected to the pixel electrode PE at a connective position P2. In the example of FIG. 4, connective position P2 is included in the end area 50. The semiconductor layer SC intersects the upper scanning signal line G in the figure twice. Thus, FIG. 4 shows an example in which the switching element SW is a double-gate switching element. However, the switching element SW may be a single-gate switching element which intersects the scanning signal line G only once.

In FIG. 4, the border portions of the light-shielding layer 22 are shown with alternate long and short dash lines. The light-shielding layer 22 overlaps the scanning signal lines G, the video signal lines S and the switching element SW. Moreover, in the example of FIG. 4, the light-shielding layer 22 overlaps the entire part of the axial area 30, and overlaps the proximal ends (the vicinity of the positions connected to the axial area 30) and distal ends of the branch areas 40. The light-shielding layer 22 may not overlap a part of the axial area 30. The light-shielding layer 22 may not overlap the proximal ends or distal ends of the branch areas 40.

Alignment treatment is applied to the first alignment film 13 and the second alignment film 24 shown in FIG. 3 in an alignment treatment direction AD parallel to the first direction D1. Thus, the first alignment film 13 and the second alignment film 24 have a function for causing the liquid crystal molecules to align in the initial alignment direction parallel to the alignment treatment direction AD. In the present embodiment, the direction of extension of the branch areas 40 conforms to the initial alignment direction of the liquid crystal molecules.

Figure 5:
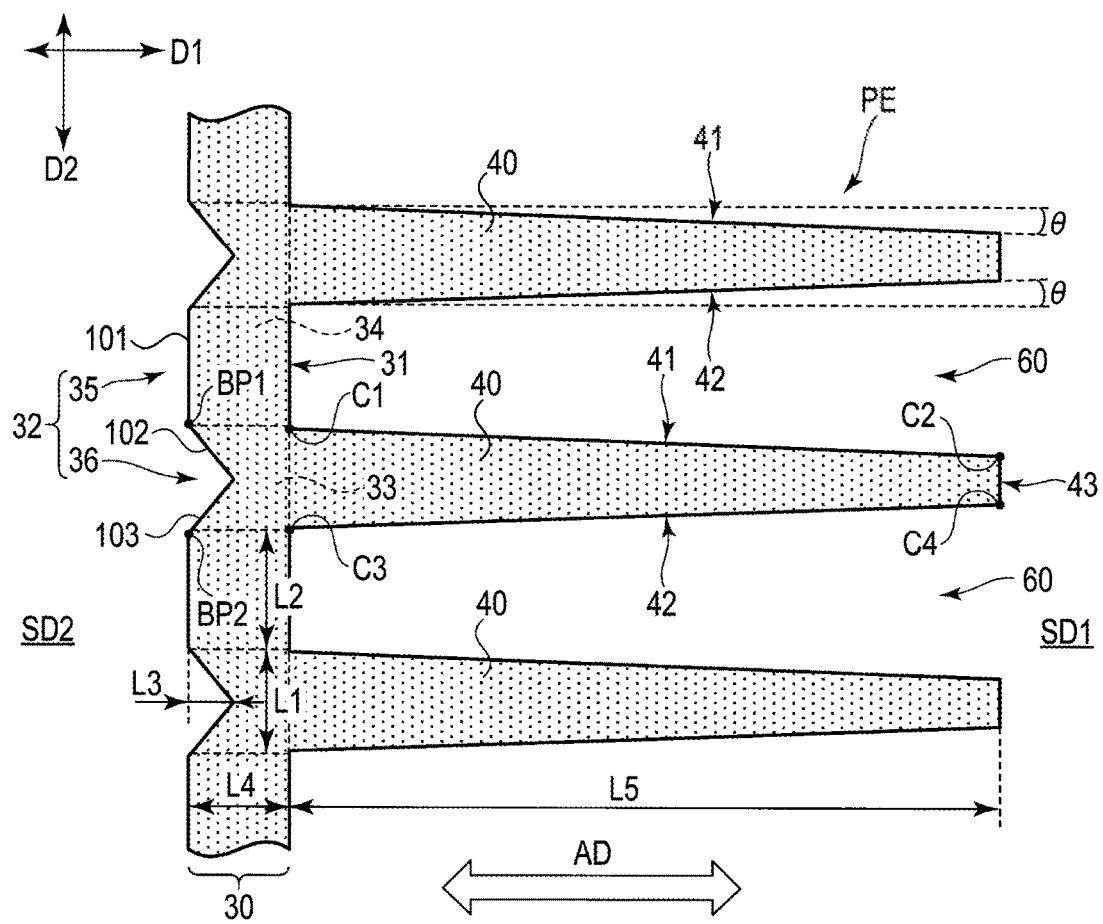
FIG. 5 is a partial enlarged view of the pixel electrode shown in FIG. 4.

Now, this specification explains the details of the shape of the pixel electrode PE (the first area A1). FIG. 5 is a partial enlarged view of the pixel electrode PE shown in FIG. 4. Each branch area 40 comprises a first edge 41 and a second edge 42 in the second direction D2. Each branch area 40 further comprises a top edge 43 connecting the first edge 41 and the second edge 42 at the distal end. The axial area 30 comprises a bottom edge 31 between two adjacent branch areas 40. Each first edge 41 is inclined by an angle θ (for example, approximately 1 degree) which is an acute angle in a clockwise direction with respect to the alignment treatment direction AD. Each second edge 42 is inclined by the angle θ in a counterclockwise direction with respect to the alignment treatment direction AD.

A corner C1 is formed by the bottom edge 31 and the first edge 41. A corner C2 is formed by the first edge 41 and the top edge 43. A corner C3 is formed by the bottom edge 31 and the second edge 42. A corner C4 is formed by the second edge 42 and the top edge 43.

The axial area 30 comprises connective areas 33 connected to the branch areas 40, and non-connective areas 34 adjacent to the gap areas 60 in the first direction D1. The connective areas 33 and the non-connective areas 34 are alternately arranged in the second direction D2.

The axial area 30 comprises an edge 32 on a side opposite to the bottom edges 31. The edge 32 corresponds to a side of the axial area 30 on the second side SD2. The edge 32 comprises a flat portion 101 provided in each non-connective area 34, and inclined portions 102 and 103 provided in each connective area 33. The flat portion 101 and inclined portions 102 and 103 are repeatedly formed in this order in the second direction D2. Each flat portion 101 extends parallel to the second direction D2. Inclined portions 102 and 103 extend in directions intersecting the first and second directions D1 and D2.

By the flat portions 101 and inclined portions 102 and 103, projection portions 35 projecting to the second side SD2 and concave portions 36 depressed to the first side SD1 are alternately formed. Each projection portion 35 is in alignment with a corresponding gap area 60 in the first direction D1. Each concave portion 36 is in alignment with a corresponding branch area 40 in the first direction D1. In the example of FIG. 5, the concave portions 36 are provided in the connective areas 33. The projection portions 35 are equivalent to portions between adjacent concave portions 36, in other words, the non-connective areas 34. For example, as shown in FIG. 5, each concave portion 36 is a triangle comprising inclined portions 102 and 103 in plan view. In plan view, each projection portion 35 is a trapezoid comprising the flat portion 101 and inclined portions 102 and 103. The shapes of the concave portions 36 or the projection portions 35 are not limited to this example. For example, each concave portion 36 may be trapezoidal, and each projection portion 35 may be triangular.

Bend portions BP1 and BP2 are formed at the borders between each connective area 33 and the two non-connective areas 34 provided above and under the connective area 33 (or the borders between each concave portion 36 and the projection portions 35). In the example of FIG. 5, each bend portion BP1 comprises the flat portion 101 and inclined portion 102. Each bend portion BP2 comprises the flat portion 101 and inclined portion 103. For example, bend portions BP1 and BP2 are preferably extensions of the first and second edges 41 and 42 of each branch area 40, respectively.

The length of each connective area 33 in the second direction D2 is L1. The length of each non-connective area 34 in the second direction D2 is L2. Length L2 is preferably greater than length L1 (L2>L1). However, length L2 may be less than or equal to length L1 (L2≤L1).

The length (height) of each projection portion 35 in the first direction D1 is L3. Length L3 is equivalent to the length (depth) of each concave portion 36 in the first direction D1. The length (width) of each non-connective area 34 in the first direction D1 is L4. The maximum length of each connective area 33 in the first direction D1 is also L4. For example, length L3 is preferably greater than or equal to 1 μm. Length L3 is preferably greater than or equal to one-third of length L4.

The length of each branch area 40 in the first direction D1 is L5. Each branch area 40 is an area substantially contributing to display. As described above, the axial area 30 overlaps the light-shielding layer 22. Thus, when length L3 of each projection portion 35 is excessively great in comparison with length L5 of each branch area 40, an area which does not contribute to display is large. Thus, the display quality is degraded. In this respect, length L4 of each non-connective area 34 in the first direction D1 is preferably less than or equal to one-fifth of the total width (L4+L5) of the connective area 33 and the branch area 40 in the first direction D1.

The projection portions 35 or the concave portions 36 are not limited to the example shown in FIG. 5. They may be modified in various ways such as the shapes of the second to fourth embodiments described later.

The shape of the pixel electrodes PE of the present embodiment allows the realization of a high-speed response mode in which the response is faster than that of the common FFS mode. The speed of response can be defined as, for example, the speed when the light transmittance of the liquid crystal layer LC is changed between predetermined levels by the voltage application between the pixel electrodes PE and the common electrode CE.

Figure 6:
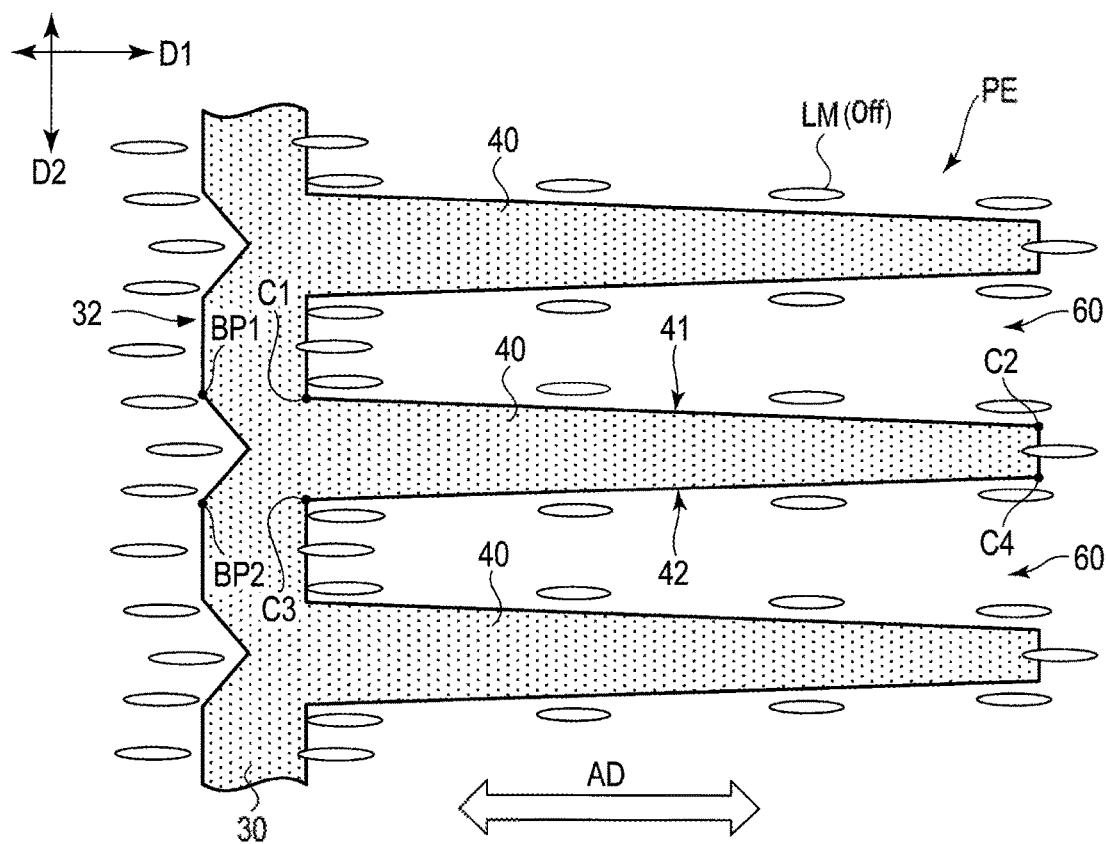
FIG. 6 shows the initial alignment state of liquid crystal molecules when no electric field is generated.
Figure 7:
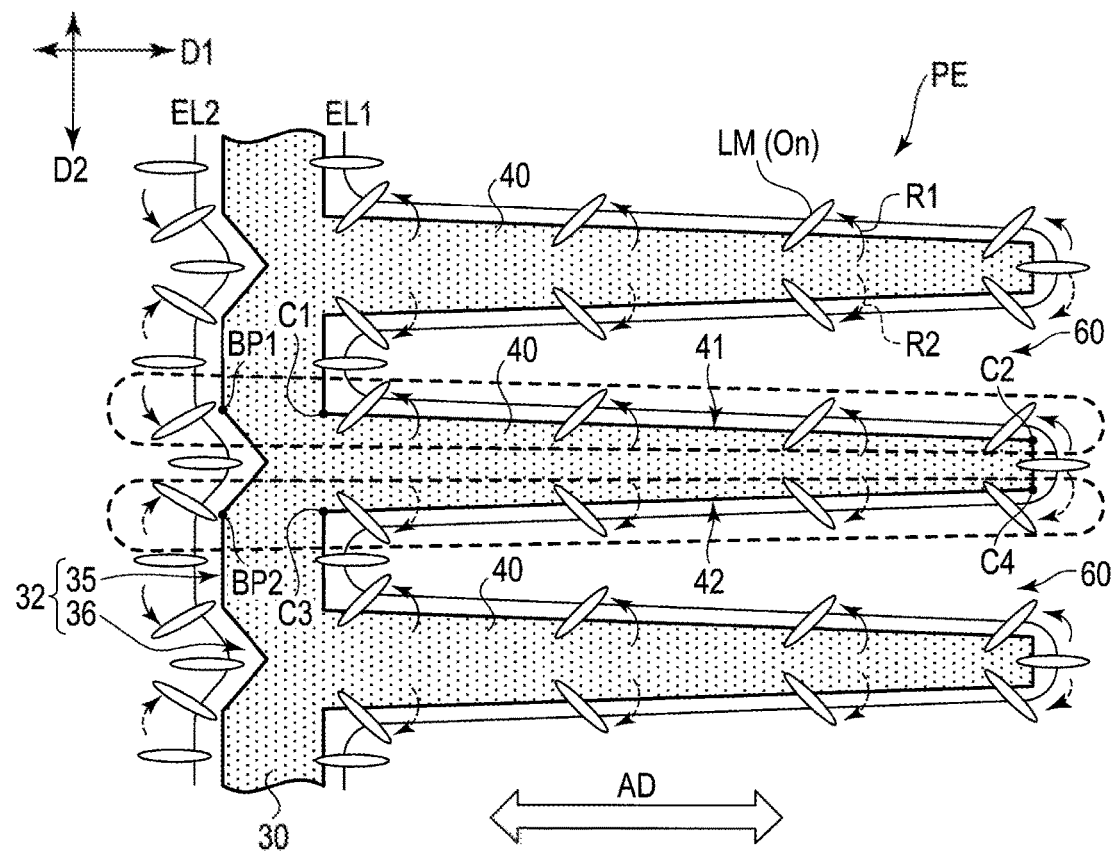
FIG. 7 shows the alignment state of liquid crystal molecules when an electric field is generated.

Now, this specification explains the operation principle of the high-speed response mode with reference to FIG. 6 and FIG. 7.

FIG. 6 shows a part of the pixel electrode PE (the first area A1), and the initial alignment state of the liquid crystal molecules LM contained in the liquid crystal layer LC. As shown in FIG. 6, the liquid crystal molecules LM are initially aligned such that the long axis conforms to the alignment treatment direction AD in an off-state where no voltage is applied between the pixel electrode PE and the common electrode CE.

In the common FFS mode which is widely used, all the liquid crystal molecules rotate in the same direction when a fringe electric field is formed between two electrodes. However, the rotation of the liquid crystal molecules in high-speed response mode is different from that of the liquid crystal molecules in FFS mode.

FIG. 7 shows the alignment state of the liquid crystal molecules LM in an on-state where voltage is applied between the pixel electrode PE and the common electrode CE. Lines EL1 and EL2 shown in FIG. 7 are examples of equipotential lines of the electric field generated around the pixel electrode PE. In the liquid crystal molecules LM of the present embodiment, the dielectric anisotropy is positive. Therefore, when voltage is applied between the pixel electrode PE and the common electrode CE in the off-state shown in FIG. 6, force is applied to rotate the liquid crystal molecules LM such that the long axis is made parallel to the direction of the electric field generated by the application of voltage (or is made perpendicular to equipotential lines EL1 and EL2).

The liquid crystal molecules LM rotate in a first rotational direction R1 indicated with the solid arrows near corners C1 and C2. The liquid crystal molecules LM rotate in a second rotational direction R2 indicated with the dashed arrows near corners C3 and C4. The first rotational direction R1 and the second rotational direction R2 are directions different from each other (in other words, rotational directions opposite to each other).

Corners C1 to C4 have a function for controlling the alignment (in other words, a function for stabilizing the alignment) by controlling the rotational direction of the liquid crystal molecules LM near the first and second edges 41 and 42. The liquid crystal molecules LM near the first edges 41 rotate in the first rotational direction R1 in connection with the rotation of the liquid crystal molecules LM near corners C1 and C2. The liquid crystal molecules LM near the second edges 42 rotate in the second rotational direction R2 in connection with the rotation of the liquid crystal molecules LM near corners C3 and C4. Near the center of each branch area 40 and the center of each gap area 60 in the second direction D2, the liquid crystal molecules LM rotating in the first rotational direction R1 compete with the liquid crystal molecules LM rotating in the second rotational direction R2. The liquid crystal molecules LM in these areas are maintained in the initial alignment state, and hardly rotate.

As described above, in high-speed response mode, the rotational directions of the liquid crystal molecules LM are aligned from the proximal ends to the distal ends near the first and second edges 41 and 42. Thus, when voltage is applied, a response can be made fast. Moreover, the rotational directions of the liquid crystal molecules LM can be uniform. Thus, it is possible to improve the stability of alignment.

In the branch areas 40, the first and second edges 41 and 42 are inclined with respect to the alignment treatment direction AD. This structure also contributes to the improvement of the stability of alignment. Near the first and second edges 41 and 42 inclined with respect to the alignment treatment direction AD, the direction of the electric field intersects the alignment treatment direction AD at an angle other than a right angle. Thus, it is possible to cause the rotational direction of the liquid crystal molecules LM to be substantially constant when voltage is applied.

Now, this specification particularly looks at the vicinity of the edge 32 of the axial area 30. As described above, the edge 32 comprises the projection portions 35 and the concave portions 36. Equipotential line EL2 meanders in line with the shapes of the projection portions 35 and the concave portions 36. From bend portions BP1 and BP2 to the center of the concave portion 36 in the second direction D2, equipotential line EL2 inclines in directions intersecting the first and second directions D1 and D2. In this way, near bend portions BP1, the liquid crystal molecules LM rotate in the first rotational direction R1. Near bend portions PB2, the liquid crystal molecules LM rotate in the second rotational direction R2. Near the center of each concave portion 36 and the center of each projection area 35 in the second direction D2, the liquid crystal molecules LM rotating in the first rotational direction R1 compete with the liquid crystal molecules LM rotating in the second rotational direction R2. The liquid crystal molecules LM in these areas are maintained in the initial alignment state, and hardly rotate.

When the liquid crystal molecules LM near the edge 32 rotate as describe above, as surrounded by dashed frames, the rotational directions of the liquid crystal molecules LM are aligned from the first edge 41 to bend portion BP1, and further, the rotational directions of the liquid crystal molecules LM are aligned from the second line 42 to bend portion BP2. From the branch areas 40 to the concave portions 36, the liquid crystal molecules LM do not rotate in the centers of the branch areas 40 or the concave portions 36 in the second direction D2. Similarly, from the gap areas 60 to the projection portions 35, the liquid crystal molecules LM do not rotate in the centers of the gap areas 60 or the projection portions 35 in the second direction D2.

A comparison example with the present embodiment is shown in FIG. 8. The comparison example assumes that the edge 32 of the axial area 30 is flat in the second direction D2. In this case, equipotential line EL2 is parallel to the second direction D2 over the entire edge 32. Since equipotential line EL2 is perpendicular to the alignment treatment direction AD, the liquid crystal molecules LM near the edge 32 may rotate in either the first rotational direction R1 or the second rotational direction R2. Thus, the state is unstable. For example, in a case of pixels with high-definition, the electrodes are small. Thus, the first and second rotational directions R1 and R2 of the liquid crystal molecules LM near the edge 32 more easily become unstable. For example, when the length of the axial area (in FIG. 5, each non-connective area 34) is less than or equal to 3.5 μm, or less than or equal to 3 μm, the above unstable rotation more easily occurs.

When the liquid crystal molecules LM near the extension of the first edge 41 rotate in the second rotational direction R2, the rotational direction of the liquid crystal molecules near the first edge 41 is not aligned with that near the edge 32. Similarly, when the liquid crystal molecules LM near the extension of the second edge 42 rotate in the first rotational direction R1, the rotational direction of the liquid crystal molecules near the second edge 42 is not aligned with that near the edge 32. When the rotational directions are not aligned with each other in this way, the speed of response is slow near the first and second edges 41 and 42.

When equipotential line LE2 is bent as shown in FIG. 7 by providing the projection portions 35 or the concave portions 36 in the edge 32, the rotational directions of the liquid crystal molecules LM near the edge 32 are aligned with those near the first and second edges 41 and 42. In this way, the speed of response in high-speed response mode can be further increased.

By increasing the speed of response, the image displayed on the display device 1 is quickly switched. Thus, various preferable effects can be obtained. For example, an image can be displayed with high quality.

The shape of each pixel electrode PE (first area A1) is not limited to the example disclosed in the present embodiment. Modification examples of the shape of each pixel electrode PE are shown in the following second to fifth embodiments.

Second Embodiment

FIG. 9 is a general plan view showing a part of a pixel electrode PE according to the second embodiment. In the pixel electrode PE shown in FIG. 9, an edge 32 provided in an axial area 30 comprises a flat portion 201 provided in each non-connective area 34, a flat portion 202 provided in each connective area 33, and inclined portions 203 and 204 provided between flat portions 201 and 202. Flat portion 201, inclined portion 203, flat portion 202 and inclined portion 204 are repeatedly formed in this order in a second direction D2.

Flat portions 201 and 202 are parallel to, for example, the second direction D2. For example, inclined portions 203 and 204 are inclined at the same angles as edges 41 and 42 of each branch area 40, respectively, with respect to a first direction D1. Projection portions 35 and concave portions 36 are alternately formed in the second direction D2 by flat portions 201 and 202 and inclined portions 203 and 204. Each projection portion 35 is a trapezoid comprising flat portion 201 and inclined portions 203 and 204. Each concave portion 36 is a trapezoid comprising flat portion 202 and inclined portions 203 and 204. Bend portions BP1 and BP2 are formed at the borders between flat portion 201 and inclined portions 203 and 204. For example, bend portions BP1 and BP2 are extensions of edges 41 and 42.

In the example of FIG. 9, the shape of each projection portion 35 comprising inclined portions 203 and 204 and flat portion 201 is similar to that of each gap area 60 comprising edges 41 and 42 and a bottom edge 31. In this disclosure, the term "similar" includes the meaning in which two objects merely resemble each other in shape in addition to the geometric meaning in which, when one of two objects is reduced or enlarged, the object coincides precisely with the other object. For example, even when the angle between each of inclined portions 203 and 204 and flat portion 201 is different from the angle between each of edges 41 and 42 and the bottom edge 31, the projection portion 35 resembles the gap area 60 in shape in respect that they are trapezoidal as a whole. Thus, this case is included in the concept of "similar" in the present disclosure.

Third Embodiment

Figure 10:
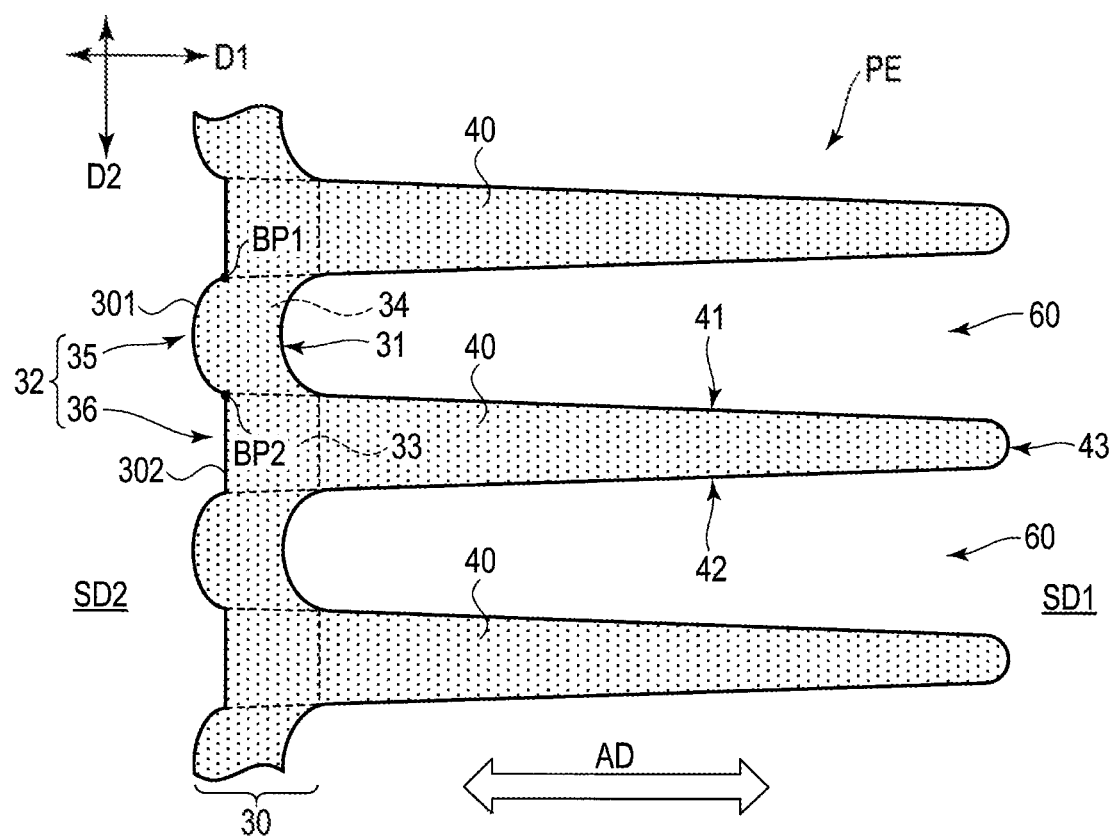
FIG. 10 is a general plan view showing a part of a pixel electrode according to a third embodiment.

FIG. 10 is a general plan view showing a part of a pixel electrode PE according to the third embodiment. In the pixel electrode PE shown in FIG. 10, an edge 32 provided in an axial area 30 comprises a curved portion 301 provided in each non-connective area 34, and a flat portion 302 provided in each connective area 33. The curved portion 301 and the flat portion 302 are repeatedly formed in a second direction D2.

For example, each curved portion 301 has an arcuate shape projecting to a second side SD2. Each flat portion 302 is parallel to, for example, the second direction D2. Projection portions 35 and concave portions 36 are alternately formed in the second direction D2 by the curved portions 301 and the flat portions 302. Bend portions BP1 and BP2 are formed at the borders between the curved portion 301 and the flat portions 302. For example, bend portions BP1 and BP2 are extensions of edges 41 and 42.

In the example of FIG. 10, each bottom edge 31 is curved in a manner similar to that of each curved portion 301. The end portion (bottom edge 31) of each gap area 60 on the second side SD2 has an arcuate shape projecting to the second side SD2. A top edge 43 of each branch area 40 has an arcuate shape projecting to a first side SD1.

In a manner similar to that of the second embodiment, the shape of each projection portion 35 including the curved portion 301 is similar to that of each gap area 60 including the bottom edge 31. For example, even when the curvature or the position of the center of curvature differs between each curved portion 301 and each bottom edge 31, each projection portion 35 resembles each gap area 60 in shape in respect that they are curved so as to project to the second side SD2 as a whole. Thus, this case is included in the concept of "similar" in the present disclosure.

Fourth Embodiment

Figure 11:
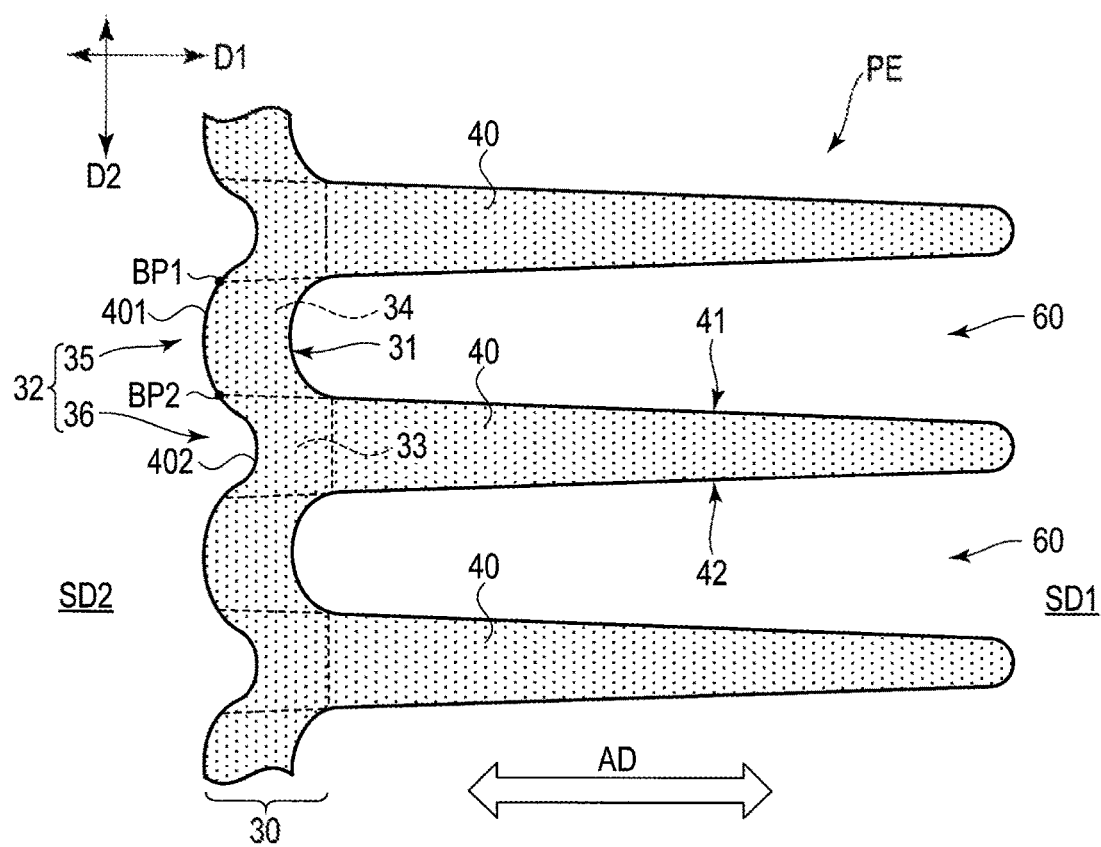
FIG. 11 is a general plan view showing a part of a pixel electrode according to a fourth embodiment.

FIG. 11 is a general plan view showing a part of a pixel electrode PE according to the fourth embodiment. In the pixel electrode PE shown in FIG. 11, an edge 32 provided in an axial area 30 comprises a curved portion 401 provided in each non-connective area 34, and a curved portion 402 provided in each connective area 33. Curved portions 401 and 402 are repeatedly formed in a second direction D2.

Each curved portion 401 has an arcuate shape projecting to a second side SD2. Each curved portion 402 has an arcuate shape depressed to a first side SD1. Curved portions 401 and 402 are smoothly connected to each other, and form a meandering shape. Projection portions 35 and concave portions 36 are alternately formed in the second direction D2 by curved portions 401 and 402. In the present embodiment, the borders between curved portions 401 and 402 are defined as bend portions BP1 and BP2. For example, bend portions BP1 and BP2 are extensions of edges 41 and 42.

In a manner similar to that of the third embodiment, the shape of each projection portion 35 comprising curved portion 401 is similar to that of each gap area 60 comprising a bottom edge 31.

Even with the shape of each pixel electrode PE of the second to fourth embodiments, when an electric field is generated between the pixel electrode PE and the common electrode CE, the rotational directions of the liquid crystal molecules are aligned from the first edges 41 to bend portions BP2. Further, the rotational directions of the liquid crystal molecules are aligned from the second edges 42 to bend portions PB1. Thus, in a manner similar to that of the first embodiment, the speed of response in high-speed response mode can be further increased.

Fifth Embodiment

The fifth embodiment is explained. This section mainly looks at the differences from the first embodiment, and the explanations of the same structures as those of the first embodiment are omitted unless necessary.

Figure 12:
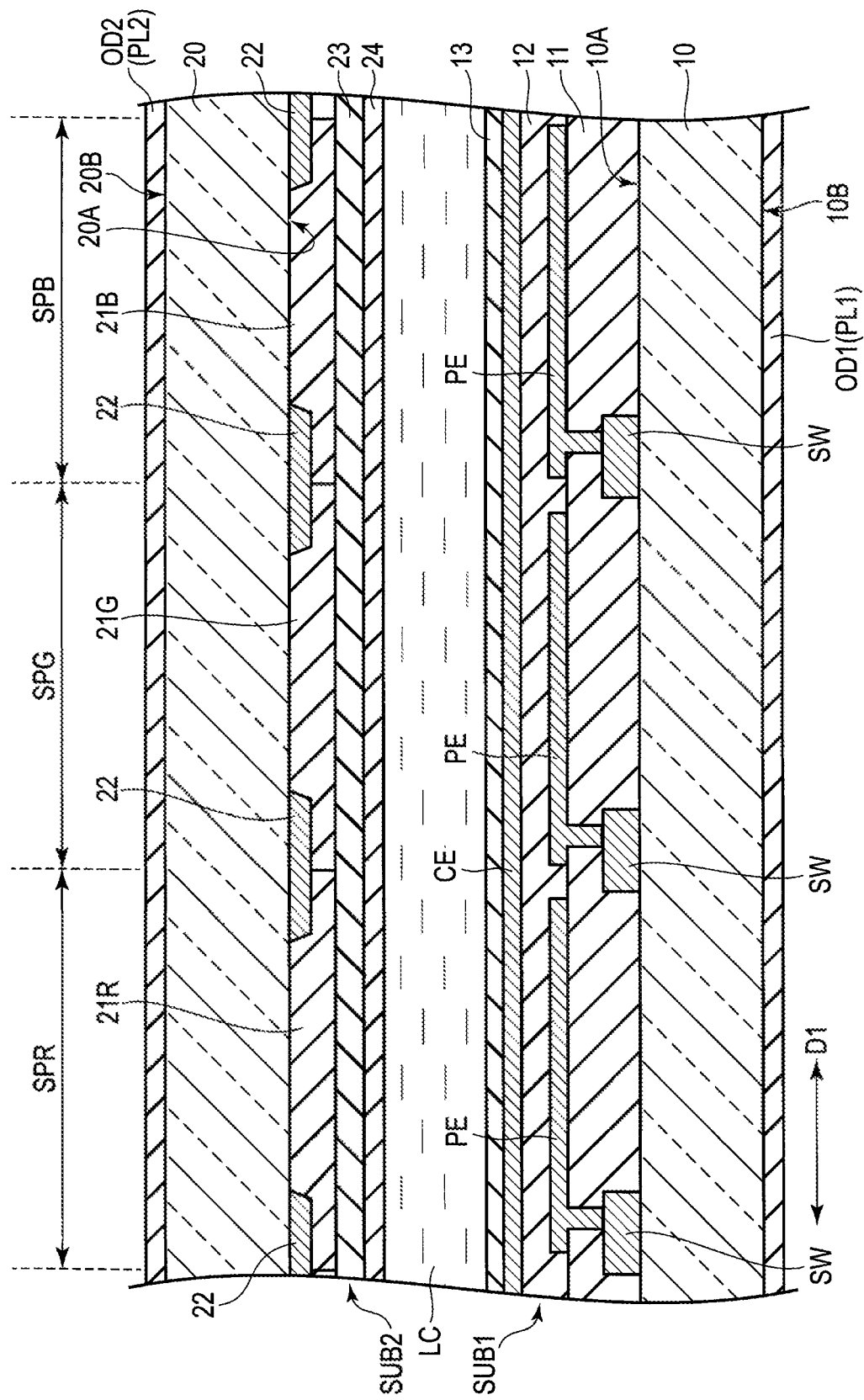
FIG. 12 shows a part of a cross-sectional surface of a liquid crystal display device according to a fifth embodiment.

In the present embodiment, a common electrode CE is provided between pixel electrodes PE and a liquid crystal layer LC. In this respect, the present embodiment is different from the first embodiment. FIG. 12 shows a part of a cross-sectional surface of a display device 1 according to the fifth embodiment. In a manner similar to that of FIG. 3, FIG. 12 shows the cross-sectional surfaces of subpixels SPR, SPG and SPB in a first direction D1. The illustration of scanning signal lines G or video signal lines S is omitted. Further, each switching element SW is simplified.

In FIG. 12, the pixel electrodes PE are formed on a first insulating layer 11 and are covered with a second insulating layer 12. The common electrode CE is formed on the second insulating layer 12 and is covered with a first alignment film 13. The other structures are the same as those of FIG. 3.

Figure 13:
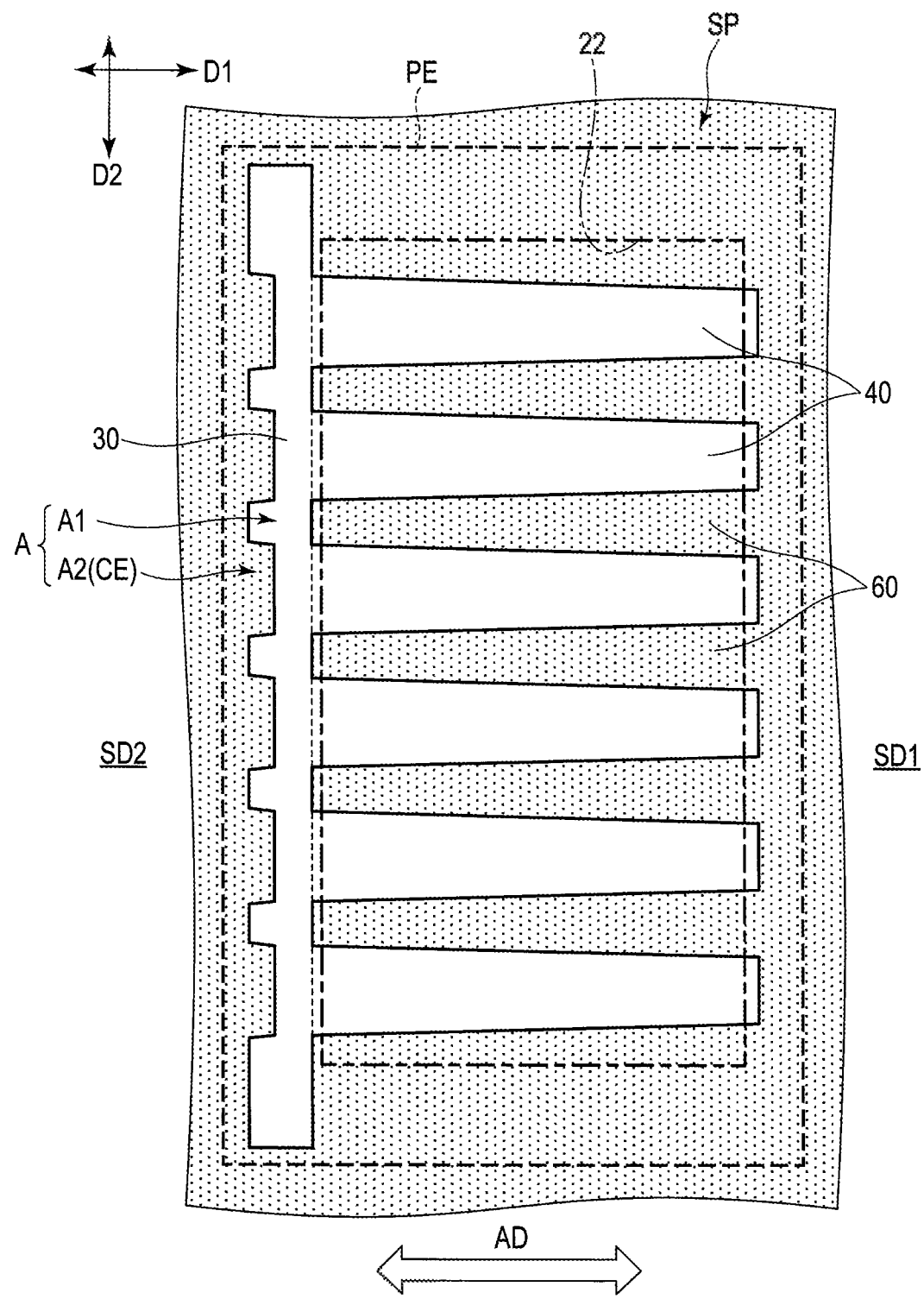
FIG. 13 is a general plan view of a common electrode according to the fifth embodiment.

FIG. 13 is a general plan view of the common electrode CE. FIG. 13 mainly shows a subpixel area A corresponding to a single subpixel SP. In the example of FIG. 13, the subpixel area A comprises a first area A1 and a second area A2 in a manner similar to that of FIG. 4. The first area A1 comprises an axial area 30 and a plurality of branch areas 40. The second area A2 comprises a plurality of gap areas 60. In the present embodiment, the first area A1 is an area in which the common electrode CE is not present. The second area A2 is an area in which the common electrode CE is present. The first area A1 is a slit (aperture) comprising the axial area 30 and the branch areas 40. For the shape of the first area A1, any one of the shapes of the first areas A1 of the first to fourth embodiments may be applied. For example, in FIG. 13, the same shape as that of the second embodiment (FIG. 9) is employed.

The pixel electrode PE has, for example, the outline indicated with the dashed frame, and overlaps the first area A1 as seen in plan view. For example, a light-shielding layer 22 overlaps the axial area 30 and the proximal and distal ends of each branch area 40, and opens in the form indicated with the alternate long and short dash line.

Figure 14:
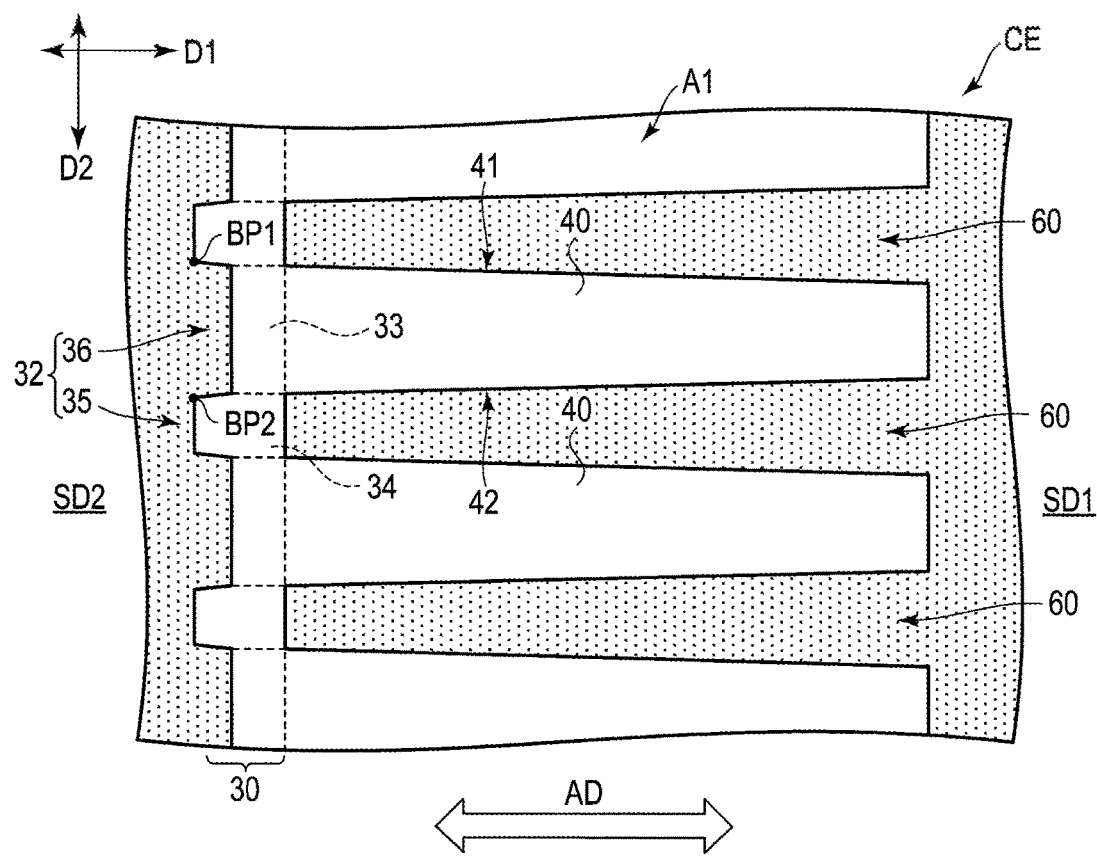
FIG. 14 is a partial enlarged view of the pixel electrode shown in FIG. 13.

FIG. 14 is a partial enlarged view of the pixel electrode PE shown in FIG. 13. The axial area 30 comprises connective areas 33 and non-connective areas 34 in a manner similar to that of the example of FIG. 9. Each projection portion 35 is in alignment with a corresponding gap area 60 in the first direction D1. Each concave portion 36 is in alignment with a corresponding branch area 40 in the first direction D1. Further, the axial area 30 comprises the projection portion 35 in each non-connective area 34, and the concave portion 36 in each connective area 33. Bend portions BP1 and BP2 are formed at the borders between the connective area 33 and the non-connective areas 34 (or the borders between the projection portions 35 and the concave portion 36).

Even with this shape, in a manner similar to that of the above embodiments, the rotational directions of the liquid crystal molecules are aligned from edges 41 and 42 of each branch area 40 to bend portions BP1 and BP2. Thus, in the structure of the present embodiment, a high-response mode similar to that of the above embodiments can be realized.

Each of the first to fifth embodiments discloses a structure which can be adopted when the dielectric anisotropy of the liquid crystal molecules of the liquid crystal layer LC is positive. However, the liquid crystal layer LC may be structured by liquid crystal molecules in which the dielectric anisotropy is negative. In this case, the alignment treatment direction AD (or the initial alignment direction of liquid crystal molecules) may be a direction (the second direction D2) perpendicular to the extension direction (the first direction D1) of the branch areas 40.

All of the display devices which may be realized by a person of ordinary skill in the art by appropriately changing the design based on the display device explained as each embodiment of the present invention fall within the scope of the present invention as long as they encompass the spirit of the invention.

Various modification examples which may be conceived by a person of ordinary skill in the art in the scope of the idea of the present invention will also fall within the scope of the invention. For example, even if a person of ordinary skill in the art arbitrarily modifies the above embodiments by adding or deleting a structural element or changing the design of a structural element, or adding or omitting a step or changing the condition of a step, all of the modifications fall within the scope of the present invention as long as they are in keeping with the spirit of the invention.

Further, other effects which may be obtained from the embodiments and are self-explanatory from the descriptions of the specification or can be arbitrarily conceived by a person of ordinary skill in the art are considered as the effects of the present invention as a matter of course.

What is claimed is:
1. A liquid crystal display device comprising:
a first substrate;
a second substrate;
a light-shielding layer; and
a liquid crystal layer including liquid crystal molecules between the first substrate and the second substrate, wherein
the first substrate comprises:
a plurality of video signal lines;
pixel electrodes electrically connected to the video signal lines;
a common electrode facing the pixel electrodes and rotating the liquid crystal molecules by generating an electric field between the common electrode and the pixel electrodes; and
a plurality of subpixel areas each comprising a first area and a second area,
the first area is an area in which the pixel electrode is present, and the second area is an area in which the pixel electrode is not present,
each of the subpixel areas comprises a first side and a second side in a first direction,
the first area includes an axial area extending in a second direction intersecting the first direction, and a plurality of branch areas extending in the first direction from the axial area to the first side,
the second area includes a gap area extending in the first direction between the adjacent branch areas, and
the axial area comprises a projection portion projecting to the second side and in alignment with the gap area in the first direction, and overlaps the light-shielding layer.

2. The liquid crystal display device of claim 1, wherein the axial area includes connective areas connected to the branch areas, and a non-connective area adjacent to the gap area, and
a width of the non-connective area in the first direction is less than or equal to one-fifth of a total width of the connective area and the branch area in the first direction.

3. The liquid crystal display device of claim 2, wherein a width of the non-connective area in the second direction is greater than a width of the connective area in the second direction.

4. The liquid crystal display device of claim 1, wherein each of the branch areas comprises a first edge and a second edge arranged in the second direction, and
when the electric field is generated, a rotational direction of the liquid crystal molecules differs between a vicinity of the first edge and a vicinity of the second edge.

5. The liquid crystal display device of claim 1, wherein an end portion of the gap area on the second side projects to the second side.

6. The liquid crystal display device of claim 1, wherein the axial area includes connective areas connected to the branch areas, and a non-connective area adjacent to the gap area, and
the axial area comprises a bend portion in an edge on the second side at a border between the non-connective area and the connective area.

7. The liquid crystal display device of claim 1, wherein the axial area includes connective areas connected to the branch areas, and a non-connective area adjacent to the gap area, and
a length of the projection portion in the first direction is greater than or equal to one-third of a length of the non-connective area in the first direction.

8. The liquid crystal display device of claim 1, wherein the first substrate comprises a first alignment film,
the second substrate comprises a second alignment film, and
an alignment direction of the liquid crystal molecules by the first alignment film and the second alignment film conforms to the first direction or a direction perpendicular to the first direction.

9. The liquid crystal display device of claim 1, wherein the first substrate comprises a first alignment film, the second substrate comprises a second alignment film, and at least one of the first alignment film and the second alignment film is an optical alignment film.

10. The liquid crystal display device of claim 1, wherein each of the branch areas comprises a first edge and a second edge arranged in the second direction, the axial area includes connective areas connected to the branch areas, and a non-connective area adjacent to the gap area, the axial area comprises a bend portion in an edge on the second side at a border between the non-connective area and the connective area, and when the electric field is generated, the liquid crystal molecules rotate in a first rotational direction from a vicinity of the first edge to a vicinity of the bend portion which is an extension of the first edge, and the liquid crystal molecules rotate in a second rotational direction different from the first rotational direction from a vicinity of the second edge to a vicinity of the bend portion which is an extension of the second edge.

* * * * *